(12) United States Patent
Yan et al.

US011241118B2

(10) Patent No.: US 11,241,118 B2
(45) Date of Patent: Feb. 8, 2022

(54) FOOD PROCESSOR COMPRISING AT LEAST ONE PROCESSOR DEVICE AND ONE MONITORING DEVICE

(71) Applicant: Vorwerk & Co. Interholding GmbH, Wuppertal (DE)

(72) Inventors: Wenjie Yan, Düsseldorf (DE); Maximilian Könnings, Zürich (CH); Maria Resende, Lisbon (PT)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 612 days.

(21) Appl. No.: 16/308,241

(22) PCT Filed: Jun. 8, 2017

(86) PCT No.: PCT/EP2017/063996
§ 371 (c)(1),
(2) Date: Dec. 7, 2018

(87) PCT Pub. No.: WO2017/211972
PCT Pub. Date: Dec. 14, 2017

(65) Prior Publication Data
US 2019/0191930 A1 Jun. 27, 2019

(30) Foreign Application Priority Data
Jun. 10, 2016 (DE) ...................... 10 2016 110 713.1

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *G06T 7/0002* (2013.01); *H04W 4/80* (2018.02)

(58) Field of Classification Search
CPC ... A47J 43/0716; A47J 43/046; G06T 7/0002; H04W 4/80
See application file for complete search history.

(56) References Cited

U.S. PATENT DOCUMENTS

2015/0260699 A1* 9/2015 Minvielle ........... A47J 37/0623
426/231
2015/0305566 A1* 10/2015 Koetz ..................... A47J 43/07
366/145
(Continued)

FOREIGN PATENT DOCUMENTS

CN 104519774 A 4/2015
DE 102013106691 A1 1/2014
(Continued)

OTHER PUBLICATIONS

First Office Action for Chinese Application No. 201780028549.3 dated May 21, 2021, with its English summary, 14 pages.
(Continued)

*Primary Examiner* — Omar Flores Sanchez
(74) *Attorney, Agent, or Firm* — Rudy J. Ng; Bret E. Field; Bozicevic, Field & Francis LLP

(57) ABSTRACT

The invention relates to a food processor (10) comprising at least one processor device (50) and one monitoring device (200). In a preparation mode, said processor device (50) can be actuated so as to prepare food at least partly automatically, said monitoring device (200) comprising at least one sensor (52) for determining at least one first and one second recording (101.1, 101.2), wherein the second recording (101.2) such that, depending on this difference, a future specific state of preparation can be ascertained. The monitoring device (200) comprises a process unit (210) by means of which an item of analysis information can be determined based on the first and/or second recording (101.1, 101.2), an analysis (140) of said analysis information can be carried out
(Continued)

in order to determine an analysis result specific to said future specific state of preparation, and at least one control signal (161) can be emitted to influence the preparation mode, depending on said analysis result.

21 Claims, 4 Drawing Sheets

(51) Int. Cl.
    *G06T 7/00*     (2017.01)
    *H04W 4/80*     (2018.01)

(56) References Cited

U.S. PATENT DOCUMENTS

2017/0245687 A1\* 8/2017 Stach ................ A47J 43/04
2018/0003687 A1\* 1/2018 Minvielle .......... A47J 43/0716
2018/0059790 A1\* 3/2018 Kolar ................ A47J 43/07

FOREIGN PATENT DOCUMENTS

| DE | 102014112115 A1 | 2/2016 |
| TW | I513440 B | 12/2015 |
| TW | I517820 B | 1/2016 |
| TW | M515364 U | 1/2016 |

OTHER PUBLICATIONS

Examination Report No. 1 for Australian Application No. 2017276751 dated Jan. 14, 2020, 3 pages.
Office Action for Taiwanese Application No. 106118330 dated Sep. 10, 2018, with its English summary, 5 pages.
Office Action for European Application No. 17728565.7 dated Jul. 8, 2021, with its English summary, 5 pages.

\* cited by examiner

FOOD PROCESSOR COMPRISING AT LEAST ONE PROCESSOR DEVICE AND ONE MONITORING DEVICE

The present invention relates to a food processor comprising at least one preparation device and at least one monitoring device. The invention furthermore relates to a method and to a computer program product.

Food processors that can prepare food in an at least partially automatic manner are known from the prior art. A food processor of this kind is disclosed for example in DE 10 2013 106 691 A1, the entire disclosure of which document is incorporated in this application.

A food processor of this kind comprises one or more preparation devices which comprise a mixer for example. In this case the preparation device can be controlled such that autonomous and/or at least partially automatic preparation is possible. This also comprises in particular the execution of recipe steps by means of the food processor.

In this case, the at least partially automatic preparation takes place in particular in accordance with programming of the food processor. The programming comprises for example specifications, such as control parameters, which are defined depending on recipe steps and/or the user setting. It is furthermore conceivable for the specifications to be adjusted depending on the food that is to be prepared. For example, preparing rice requires a different mixer speed and a different temporal mixing duration than preparing cream. The type of food is specified for example by the recipe or by the user of the food processor and set accordingly on the food processor. Depending on the type of food, the preparation is then carried out in accordance with a specified mixing duration and/or mixer speed that is optimal for preparing the food in question.

However, it is often problematic in this case that the optimal preparation and therefore the optimal values for the control parameters, such as the mixer speed and/or the mixing duration, are dependent on and influenced by a very large number of factors. Factors of this kind are for example the food characteristics (amount, percentage fat, manufacturer and the like) and/or the environmental conditions (such as the room temperature). In order to determine the optimal values for the control parameters it is therefore often not sufficient to use pre-stored values for the control parameters that were set depending on the food type, i.e. in a food-dependent manner. In particular, it is then often not possible to achieve good and comparable preparation results in the case of different requirements and environmental conditions. In this case, it is often not sufficient to take into account merely isolated factors, the costs and technical outlay for the sensor technology also being high.

An object of the present invention is therefore that of overcoming the above-described disadvantages at least in part. The object of the present invention is in particular that of allowing improved and/or simplified, at least partially automatic preparation of food. Furthermore, in particular a preparation by means of the food processor for a food intended for preparation, i.e. in particular identifying and/or defining the optimal control parameters for the food in question, with respect to the state and/or the type of the food. In this case in particular the constructive complexity and/or the costs should be reduced.

The above object is achieved by a food processor, a method, and a computer program product, e.g., as described herein. Further features and details of the invention can be found in the relevant dependent claims, the description and the drawings. In this case, features and details that are described in connection with the food processor according to the invention of course also apply in connection with the method according to the invention and the computer program product according to the invention, and vice versa in each case, and therefore, with regard to the disclosure, reciprocal reference is always/can always be made to the individual aspects of the invention.

The object is achieved in particular by a food processor comprising at least one preparation device and one monitoring device.

In this case, it is provided in particular for the preparation device to be able to be controlled, in a preparation mode, for at least partially automatic preparation of food (e.g. by means of a control signal), and for the monitoring device to comprise at least (or exclusively) one (single) sensor for identifying at least one first and second recording, in particular at different timepoints.

In this case, the second recording can in particular be identified temporally after the first recording, the first recording preferably differing from the second recording (e.g. with respect to the contents of the recording and/or the identified values of the recording), and therefore a specified future preparation state, e.g. a completion time of the food, can be ascertained on the basis of said difference.

The monitoring device preferably comprises a processing device which can determine analysis information on the basis of the first and/or second recording and can analyze the analysis information in order to determine an analysis result that is specific to the specified future preparation state, and can emit at least one control signal for influencing the preparation mode depending on the analysis result. This achieves the advantage that the preparation state can be determined and/or influenced by evaluating and/or analyzing the recordings, which recordings e.g. change specifically for the preparation for example in a time-dependent manner. In this case, the analysis can preferably be a time-dependent analysis.

The recordings, i.e. in particular the respective first and/or second and/or further recording, preferably comprise multidimensional (i.e. at least two- or three-dimensional) acquisition of acquisition variables and/or multidimensional identification of acquisition values in order to thus in particular identify a digital and/or numerical representation of a characteristic of the preparation and/or of the food. Each recording comprises (in particular as the type of record) e.g. an image recording and/or an acoustic recording and/or an olfactory recording and/or a gustatory recording and/or a recording of an at least two-dimensional force acquisition and/or an at least two-dimensional temperature recording and/or an at least two-dimensional consistency acquisition carried out on the food and/or the like. In this case, the first recording preferably differs from the second recording and/or from the following recordings only by the timepoint of the relevant recording and therefore not by the type of recording. It is particularly preferable in this case, in particular in preparation mode, for the recordings to be identified continuously and/or cyclically and/or periodically, i.e. for example the first recording is identified at a first timepoint at the start of a first period and the second recording is identified at the start of a second period, in particular over the entire temporal duration of the preparation mode.

It is conceivable in particular for the start of a recording sequence, i.e. the successive identification of the first and subsequently the second and subsequently the further recordings, to be triggered. The triggering is achieved for example by means of a clock generator and/or a timer and/or by means of the start of the preparation mode and/or the output of a trigger signal of a trigger generator, e.g. owing to a specific event occurring. The specific event is for example entry into a time-critical region or a time-critical timepoint during the preparation. In particular, each recording is initiated by an edge of the trigger signal. For this purpose, the trigger generator is for example electrically and/or electronically connected to the monitoring device and/or the sensor, for example by means of electrical lines and/or via radio.

It is furthermore conceivable for the sensor, in particular a first and/or second sensor, to comprise at least one of the following sensor units and/or to be designed as one of the following sensor units:

- an optical sensor unit, preferably an image sensor unit, preferably for acquiring image information and/or brightness as the acquisition variable,
- an acoustic sensor unit, in particular a microphone, preferably for acquiring an acoustic acquisition variable,
- an electronic nose, preferably for acquiring an odor as the acquisition variable,
- at least one thermal sensor unit, in particular an infrared sensor unit, preferably for acquiring a temperature as the acquisition variable,
- a level sensor unit, in particular for acquiring a level of a liquid in a mixing vessel of the food processor as the acquisition variable,
- a steam sensor unit, preferably for acquiring steam, resulting from the preparation, as the acquisition variable,
- a moisture sensor unit, in particular for acquiring a humidity level inside and/or outside the food processor, in particular as the acquisition variable,
- a pressure sensor unit, in particular for acquiring an air pressure inside and/or outside the food processor, in particular as the acquisition variable,
- a scanner, preferably a barcode scanner, for acquiring information relating to the preparation and/or the food, in particular on the outside of the food processor, in particular as the acquisition variable,
- at least one chemical sensor unit, preferably for acquiring an item of chemical information and/or a chemical property as the acquisition variable, wherein the sensor preferably is arranged inside the food processor and/or in the mixing vessel and/or on a lid for the mixing vessel. In this case, the electronic nose is in particular a technical system for measuring and/or acquiring odors. The electronic nose comprises for example microelectronic gas sensors and/or other sensors, a correlation among the acquisition or measurement values of said sensors preferably being evaluated, for acquiring the odors. In this case, the electronic nose in particular comprises a non-volatile memory which for example comprises reference values for comparing with the signals, acquired by the sensors, for the purpose of evaluation. The electronic nose preferably further comprises a processing unit which, for the purpose of odor measurement, for example compares the signals acquired by the sensors with the reference values and/or evaluates said signals using a model. This for example also allows for continuous monitoring of the quality of the food and/or the preparation during the preparation mode. It is intended in particular for a warning to be issued to the user of the food processor in the event of deviation of the recording and/or of the analysis result from a comparison model for example.

It is furthermore optionally possible, within the context of the invention, for the monitoring device to comprise a first sensor and a second sensor, the first sensor differing from the second sensor with respect to the variable to be acquired (e.g. acquisition variable), wherein the first sensor is able to identify the first and second recording, and the second sensor is able to identify at least one further recording and/or one further acquisition value, wherein the first and second recording preferably are of the same type as one another and are of a different type from the further recording. In particular, the (e.g. first and/or second) recording is identified by the (e.g. first) sensor in that the data acquired by the sensor (e.g. acquisition and/or measurement values) are read out by means of the processing device for example electronically. It is in particular also possible that further sensors of a different type are provided and that for example further acquisition variables of a different type are evaluated in order to improve the quality of the preparation.

It is optionally conceivable that the sensor, in particular a first sensor and/or a second sensor, comprises at least one of the following electrical components:

- an RFID sensor, in particular for acquiring information relating to the preparation and/or the food,
- an electrical energy intake unit, in particular a coil, for energy transfer and/or energy intake for an operation of the sensor,
- an electrical energy store, in particular an accumulator, which is preferably connected to the energy intake unit.

It is therefore conceivable, for example, that the sensor is arranged in a lid of the food processor, wherein the lid is designed so as to be removable and/or is completely structurally separated from the processing device. In order that it is not necessary to provide a separate mains connection on the lid and/or on the sensor, and/or in order for it also to be possible to omit a fixed (e.g. non-detachable) electrical connection between the sensor and the processing device, it is possible for example to provide an electrical energy supply for the sensor that is in particular autonomous for supplying energy to the processing device. The energy supply for the sensor can be achieved by means of inductive energy transfer using the coil for example, and can therefore charge the electrical energy store for example in order for it to thus be possible to operate the sensor in preparation mode. Energy supply by means of energy harvesting, for example, is also conceivable. This also achieves the advantage of increasing the operating comfort of the food processor. It is furthermore conceivable for the sensor and/or a further sensor of the food processor to comprise an RFID sensor in order to thus parameterize the sensor analysis and/or acquisition. In particular, a food processor control panel is also provided, in particular for carrying out and/or evaluating user input, preferably for adjusting properties of the food and/or of the preparation.

It may be advantageous for the monitoring device and/or the sensor to comprise, within the context of the invention, at least one of the following interfaces:

- a network interface, e.g. a LAN (Local Area Network) and/or WLAN (Wireless LAN) interface, in particular for transmitting information relating to the preparation and/or to the food via the network, e.g. via the (worldwide) Internet, preferably in a cloud-based manner,
- a radio interface, e.g. a Bluetooth and/or mobile communications interface, preferably for transmitting data comprising the comparison specification and/or information regarding the preparation and/or regarding the food and/or regarding the recordings and/or the acquisition values.

A user can preferably thus transmit the information and/or the data to the food processor in a flexible and simple manner, for example via a remote computer and/or a Smartphone.

It may furthermore be possible for the sensor to be fastened to the food processor so as to be detachable at least in part (i.e. also completely for example), and to be designed as a sensor that can be handled separately by a user of the food processor in order to perform an acquisition, in particular for identifying the recordings, on food inside and/or outside the food processor and/or a mixing vessel of the food processor. In particular, it is possible to thus increase the comfort during operation of the food processor and during preparation.

It is furthermore conceivable that the (first and/or second and/or a further) sensor is integrated in a mixing vessel of the food processor and acquires acquisition variables inside and/or outside the mixing vessel, wherein the mixing vessel preferably is able to be detachably inserted into a mixing vessel holder of the food processor. Alternatively or in addition, it is also conceivable for the sensor to be designed such that it can be fitted subsequently, in such a way that the sensor can be detachably inserted, preferably plugged, into the food processor and/or in a mixing vessel of the food processor and/or a lid of the mixing vessel. It is thus possible, for example, for an existing sensor to be replaced and/or for a new sensor to be fitted subsequently in order, for example, to be able to carry out the method according to the invention for additional food and/or additional acquisition variables.

In a further option, it may be possible that the sensor is designed such that it can be fitted subsequently, in particular in that the sensor is integrated in a replaceable part of the food processor, preferably in a mixing vessel, the food processor preferably comprising an adapter for different sensors. Alternatively or in addition, the sensor can be designed so as to be structurally separate from the further sensors and/or from the further parts of the monitoring device and/or to be electrically (e.g. also electronically and/or wired manner and/or wirelessly) connected to a processing device. The sensor can thus be easily replaced and/or different sensors (for example for different foods) can be used.

It may optionally be possible that a mixing vessel holder of the food processor, and/or a mixing vessel of the food processor can be inserted into the mixing vessel holder, and/or a lid of the food processor and/or a lid of the mixing vessel that can be placed on the mixing vessel, to comprise at least one electrical contact, in particular consisting of an electrically conductive material, for establishing an electrical connection to an electrical circuit of the food processor in a inserted state and/or in a placed on state, preferably for supplying energy to the sensor and/or for data transmission (e.g. from the sensor to the monitoring device), wherein the electrical contact preferably is electrically connected to the sensor, in particular both when in the inserted state and/or in the placed on state, and when not in the inserted state and/or the placed on state. It is thus possible to reliably monitor the food, in particular by means of acquiring the acquisition variables using the sensor. In this case, the sensor is for example the first sensor and/or the second sensor and/or a further sensor. The electrical contact can preferably establish an electrical connection to an electrical circuit of the processing device of the food processor. For this purpose, a connection unit, e.g. a plug connection and/or a connector holder and/or an electrically conductive contact surface to be provided on the food processor, preferably in the region of the mixing vessel holder, by means of which connection unit the electrical connection to the electrical contact can be detachably established. It is thus possible to significantly improve the comfort during operation of the food processor.

For the purpose of fixing to the connection unit it is conceivable, for example, for fastening means such as a clip connection to be used.

According to a further advantage, it may be possible for the sensor to be designed as an at least two-dimensional or three-dimensional sensor. The sensor is thus suitable for acquiring for example two-dimensional and/or three-dimensional acquisition variables and/or for identifying two-dimensional and/or three-dimensional recordings.

It is furthermore advantageous if, within the context of the invention, the sensor, in particular a first sensor, is arranged inside the food processor, preferably in a removable mixing vessel of the food processor, such that it is possible to acquire an acquisition variable directly on the food in order to identify the recording. For this purpose, the sensor is arranged in the inside of the mixing vessel and/or so as to be in operative connection with the inside of the mixing vessel for example. It is possible for the sensor to furthermore comprise a housing which comprises a seal for example, in order to thus prevent fluid from entering the housing of the sensor and thus to prevent damage to the sensor.

It is preferably possible for the sensor, in particular a second sensor, to be arranged on the food processor so as to be in contact with the environment of the food processor such that acquisition variables of the environment of the food processor can be acquired by the sensor. In this case, too, it is conceivable that the sensor to comprise a housing which is for example sealed off against entry of fluid, e.g. by means of a sealing element such as a sealing ring and/or flexible plastics material.

The invention also relates to a method for operating a food processor, wherein at least one preparation device of the food processor is controlled, in a preparation mode, so as to least partially automatically prepare at least one food and/or different foods. The control is carried out for example by means of a control device and/or by means of a control signal which is emitted by the control device and/or by a processing device. In particular, the control signal influences control parameters of the preparation, such that the control parameters, for example the mixer speed and/or mixing duration, can preferably be determined by the control device. The method according to the invention provides the same advantages as have been described in detail with reference to a food processor according to the invention. In particular, the method according to the invention may be suitable for operating a food processor according to the invention.

A monitoring device is preferably provided which, at least during preparation mode, identifies at least one recording of the prepared food that is specific to a preparation state. The monitoring device preferably also identifies acquisition values by means of acquiring at least one or two acquisition variables on the food processor that are specific to a preparation state. The food processor particularly preferably comprises the monitoring device which, in particular at least during preparation mode, identifies the acquisition values (by means of acquisition) as acquisition values that temporally follow one another in each case.

Within the context of the invention it is possible in particular for at least one of the following steps to be carried out and/or for the following steps to be carried out (e.g. temporally) in succession or in any desired sequence:

a) identifying at least one first recording of the prepared food at at least one first timepoint (i.e. also phase) of the preparation, in particular in preparation mode, b) identifying at least one second recording of the prepared food at at least one second timepoint (i.e. also phase) of the preparation, in particular in preparation mode, the first timepoint differing from the second timepoint and the first recording differing from the second recording such that a specified future preparation state, e.g. a completion time of the food, can be ascertained on the basis of the difference, c) determining an item of analysis information on the basis of the first recording and/or the second recording, d) performing at least one analysis of the item of analysis information in order to determine an analysis result specific to a specified future preparation state, e) emitting at least one control signal for influencing the preparation mode, i.e. in particular also the preparation and/or preparation parameters, on the basis of the analysis result, such that the specified future state is taken into account during the preparation.

In other words, on the basis of the identification of the recordings, in particular at different timepoints, and the analysis result that is dependent thereon, the preparation state can be taken into account during the preparation, i.e. in particular also temporally during the preparation (e.g. during the mixing and/or the operation of the mixer in preparation mode). In this case it is preferably also possible for more than two recordings, e.g. at least 3 or at least 4 or at least 5 or at least 6 or at least 10 or at least 20 recordings, to be identified, in particular during one preparation mode. Preferably, (all) the identified recordings, such as the first and second recording, differ from one another with respect to the timepoint of the identification, such that for example the first recording is identified at the first timepoint and the second recording is identified at the second timepoint. The same of course applies for further recordings at further timepoints which are identified continuously for example. In this case, each recording is preferably identified by acquiring an acquisition variable, wherein the respective relevant acquisition variables can be different and/or identical. The acquisition variable is in particular in the form of a motor signal (i.e. for example intensities such as the current intensity of the motor signal) or in the form of a temperature or the like. It may also be possible that the number and/or type of the identified recordings and/or acquired acquisition variables is defined on the basis of the (set) food to be prepared, e.g. by means of a processing device of the food processor, and/or on the basis of user input and/or a comparison specification and/or an acquisition variable. The preparation can thus be significantly improved.

Preferably the timepoint at which the identification of the record(s) and/or the acquisition (e.g. of the acquisition variables for identifying the recordings) is initiated, and/or in particular also a phase in which for example the relevant recordings occur and/or are identified, is understood as the "timepoint". For example, the timepoint at which the recording is identified may be the exposure period and/or integration period of a camera and/or the phase in which data transmission from the camera to the monitoring device takes place. Accordingly, the identification may in particular relate to acquisition and/or making of a recording by means of a sensor (e.g. by means of a camera) and/or measurement and/or transmission of the data from a sensor.

It is furthermore conceivable for the recordings, i.e. the first and second and/or further recordings, to each comprise at least one acquisition value, the acquisition value preferably being identified by means of an acquisition variable being acquired. In particular, all the acquisition values of one recording are acquired substantially simultaneously and/or in a recording phase of the recording, and differ for example with respect to the local information thereof. In particular, the acquisition values are identified by acquiring acquisition variables, wherein the acquisition variables are of the same type (e.g. always image information or temperatures). It is thus possible, for example, for a first acquisition value to be identified for example by acquiring a first acquisition variable, such as by means of a first pixel of an image sensor, and for a second acquisition variable to be identified for example by acquiring a second acquisition variable, such as by means of a second pixel of the image sensor.

It is furthermore possible, within the context of the invention, for the specified future preparation state to be for example an optimal future completion time of the prepared food during the preparation, and/or for the first recording to be identified during preparation mode and for the second (or a further) recording to be identified after the preparation mode has been deactivated, wherein the following steps then are provided:

performing a first analysis on the basis of the first recording in order to determine a first analysis result, wherein a first control signal a deactivation of the preparation mode is emitted on the basis of the first analysis result, performing a second analysis on the basis of the second (or further) recording in order to determine a second analysis result, wherein a second control signal for re-activating the preparation mode is emitted on the basis of the second analysis result.

In this case, the first analysis for example makes it possible to detect a preparation state on the basis of at least the first recording, at which state of preparation the second analysis can/should be performed and/or initiated. This state is for example a possible completion time, wherein the second analysis then is implemented in order to check the plausibility of the first analysis result (and thus for example of the completion time). In this case, the second analysis is for example an analysis that is implemented exclusively when preparation mode is deactivated, for example in order to acquire a property of the food and/or a characteristic of the food which varies in a manner specific to the particular state, owing to the deactivation of the preparation mode. This may for example be a movement, e.g. sinking, of the food when the preparation mode (e.g. mixing mode) is ended, which movement is observed for example by means of optical identification in order to acquire the second recording. This allows for reliable detection of the specified future states.

It may furthermore advantageously be possible for the recording, in particular the first recording and/or the second recording, to be identified by means of at least two-dimensional acquisition of at least one acquisition variable, wherein the recording preferably is at least one of the following recording types:

an optical recording, an acoustic recording, an olfactory recording, and/or a gustatory recording.

It is optionally also possible for one recording to comprise a plurality or all of the recording types. In particular, the analysis is adjusted such that a comparison specification which is specific for the relevant recording types is compared with the corresponding recording in order for it to be possible to optimally influence the preparation.

It may furthermore be possible that, in particular in step a), the first recording and at least one third recording and/or further recordings are identified at the first timepoint, a recording type of the first recording preferably differing form the recording type of the third recording and/or of the further recordings, and that preferably, in particular in step b), the second recording and at least one fourth recording and/or further recordings are identified at the second timepoint, the recording type of the second recording differing from the recording type of the fourth recording and/or of the further recordings, preferably, in particular in step c), wherein the analysis information is determined on the basis of at least one or all of the recordings identified at a specified timepoint. The recording is preferably identified by means of acquiring a specific acquisition variable, and in this case the recording type is in particular dependent of a type of the relevant acquisition variable. It is thus possible to consult recordings of different acquisition variables for the purpose of the analysis and to further optimize the preparation.

It is furthermore conceivable for the first recording and/or second recording to be an image recording of the prepared food and/or an acoustic recording of a sound of the food processor in preparation mode that is dependent on the preparation. In particular, in this case, at least 100×100 or at least 200×200 or at least 500×500 or at least 1,000×800 pixels are recorded for the image recording, and/or the sound is recorded for at least 1 s or at least 2 s or at least 5 s or at least 10 s for the acoustic recording. Accordingly, a multi-dimensional recording is thus provided, in order to thus advantageously optimize the preparation.

It may be possible, for example, that, during the analysis, the first recording is compared with the second recording, and/or the identified recordings are each compared with a comparison specification, in order to determine an analysis result. Comparison is also understood as operations, e.g. arithmetic operations, which are dependent on both the first and on the second recording. In this case, the analysis is in particular a time-dependent analysis and is performed in particular (e.g. in a real-time capable manner) during the preparation mode. This allows for quick and reliable detection of the specific state.

It may furthermore be conceivable for first acquisition values to be identified cyclically and/or repeatedly in preparation mode and, in parallel thereto, for second acquisition values and/or further acquisition values to be identified cyclically and/or repeatedly in preparation mode, wherein the recordings are determined on the basis of the acquisition values. Alternatively or in addition, it is conceivable for the analysis result to be determined by the analysis by means of calculating and/or predicting the specified future state, in particular the completion time, of the preparation. As a result, it is possible to optimally determine for example the acquisition values of the timepoint at which the preparation must be ended.

It may furthermore be possible for at least one comparison specification to be evaluated, during the analysis, on the basis of a prepared food, wherein the analysis information is compared with the comparison specification in particular in order to calculate and/or predict the specified future state, at least one temporal analysis curve of the analysis information preferably being compared with at least one time curve pattern of the comparison specification. The temporal analysis comprises for example at least two identified recordings and/or acquisition values which were identified in temporal succession for example. In particular, the temporal analysis curve of the analysis information is determined on the basis of the time curve of the relevant recordings. The comparison specification can therefore be used for example for parameterizing the analysis.

It may furthermore be possible for the following steps to be provided:

setting and/or selecting a food to be prepared, by means of user input on the food processor, selecting a comparison specification on the basis of the set and/or selected food, comparing values of the analysis information and/or of the analysis result with the comparison specification in order to determine (detect) the specified future state which is preferably specific for the food.

In this case, the (e.g. first and second) recording is influenced in particular by the user input and/or by the type of food in order, for example, for it to be possible to perform an analysis that is optimal for the relevant food.

It may furthermore be possible for the preparation device comprising a mixer to be controlled, in preparation mode, for at least partially automatic preparation of different foods, in particular whipped cream and/or pasta and/or rice, at least one food-specific comparison specification, for comparison with (at least one) of the recording(s) and/or the analysis result, being provided for each of said foods. This allows in particular for food-specific analysis in order to optimize the preparation result.

The time-dependent analysis preferably evaluates a plurality, in particular at least 2 and/or at least 4 and/or at least 10, of the identified acquisition values and/or recordings and/or the identified first recording and/or first acquisition value and/or the identified second recording and/or second acquisition values (and/or the values resulting therefrom in each case, as features generated therefrom in each case), e.g. compares said values with one another, in order to preferably determine (just) one analysis result. It is thus not necessary to exactly know the factors such as the food characteristics and environmental conditions because in particular the analysis result provides the necessary information in order to optimize the preparation. The preparation can preferably then be controlled on the basis of the analysis result, i.e. the preparation mode and/or the control parameters can be influenced so as to ensure the optimal preparation for the food.

It may furthermore be possible, within the context of the invention, for the acquisition variables to each comprise at least one of the following variables, in particular preparation parameters, and/or to each be and/or be influenced by at least one of the following variables:

a speed of the preparation device, preferably of a mixer of the food processor, a parameter of a drive means, preferably a motor of the drive means, e.g. a torque, a motor signal, preferably a motor current, which is dependent on a torque of the mixer of the food processor, a temperature which is in particular acquired at the prepared food by means of a temperature sensor that is integrated in the food processor, a core temperature of the prepared food, a surface temperature of the prepared food, a weight of the prepared food, wherein the weight is acquired by means of scales integrated in the food processor, a measurable parameter at the prepared food, which parameter is in particular specific for a completion time of the prepared food, a time period, preferably mixing duration of the mixer, in particular since the timepoint at which the preparation mode is activated, a brightness which is acquired at the prepared food, for example by means of an optical sensor, a volume which is acquired at the prepared food, in particular by means of an acoustic sensor, a consistency of the prepared food an electrical property of the prepared food, preferably an electrical resistance of the food, an aromatic substance concentration at the prepared and/or of the prepared food, preferably inside a mixing vessel of the food processor, a flavoring concentration at the prepared and/or of the prepared food, preferably inside a mixing vessel of the food processor, at least one chemical variable of the prepared food, in particular a pH and/or a concentration of the prepared food, a pressure in the region of the prepared food and/or a pressure curve, preferably in a mixing vessel of the food processor, at least one spectral property of the prepared food.

In this case, it is conceivable for the recordings and/or the acquisition variables to be acquired at the food before and/or during and/or after the preparation mode. It is conceivable in particular for an electronic database to be provided which for example comprises comparison values for the relevant recordings and/or acquisition variables in order to evaluate the acquisition values of the recordings in particular on the basis of said comparative values. In this way, a plurality of acquisition variables for optimizing the preparation can be related to one another, for example using statistical methods.

For example, a control parameter such as the temporal mixing duration and/or the mixer speed is influenced and/or defined by the emission of the control signal. It is thus possible to determine the optimal control parameters and/or to influence the preparation accordingly on the basis of the food (to be prepared) that is provided for the preparation. The control signal is emitted for example by a processing device and/or by the monitoring device and/or by a control device and/or by electronics of the food processor. It is furthermore possible, for example, for the determination of the analysis information and/or the analysis and/or the determination of the analysis result to be performed by the processing device, preferably by means of arithmetic operations and/or signal processing.

Furthermore, it is in particular conceivable for the analysis result which is specific for the preparation state, i.e. in particular for the state of the food during the preparation, to be determined by means of time-dependent analysis. For example, a characteristic of the food, such as the consistency and/or temperature and/or optical characteristics and/or acoustic characteristics is understood as a state of the food during the preparation, which characteristics change during the preparation (i.e. during preparation mode). In this case, the analysis information and/or the acquisition values and/or the preparation parameter is/are preferably dependent on the recordings and/or timepoints of the recordings and/or acquisition variables at the food processor, e.g. control variables and/or influencing variables and/or characteristics of the food processor and/or physical variables which are influenced by the state of the food.

Within the context of the invention, the term "recording" and/or "acquisition value" preferably refers to a detectable (for example by means of a sensor) value and/or measurement value of the acquisition variable, i.e. in particular a physical variable or measurement variable which is acquired in particular at the food processor, wherein the preparation parameter preferably is or influences the acquisition variable. The identification of the recordings and/or acquisition values in particular comprises measuring (acquiring) the acquisition variable, wherein it is possible, in this context, for "measuring" to be understood both as quantitative and as qualitative acquisition and therefore not necessarily needing to comprise defining a unit and/or quantitative statement regarding the acquisition variable. The recording and/or the acquisition value may for example merely be a voltage value and/or a current value, for example a curve being analyzed by means of the time-dependent analysis and/or consulted for the analysis information, without specific comparison with a unit. In this case, the acquisition value is proportional to and/or can be clearly associated with the actual value of the acquisition variable.

Within the context of the invention, the acquisition variable (and/or the preparation parameter) in particular denotes an item of information about and/or a characteristic of the food and/or an acquirable (measurable) physical variable (such as the speed of the mixer) and/or a control variable (such as the motor signal) and/or influencing variable (such as the temperature) at the food processor, the acquisition variable and/or the preparation parameter preferably being (exclusively) indirectly influenced by the preparation state, such as the motor current of an electrical motor for driving the mixer. For example, a change in the consistency of the food brings about a changed (mixing) resistance on the mixer and thus indirectly influences the motor current. The time curve of the recordings and/or measurement values or acquisition values is thus preferably dependent on a curve of the mixing resistance of the mixer. This has surprisingly resulted in the advantage that a time-dependent analysis, in particular of the temporally successive acquisition values, can provide the essential information for optimizing the preparation, in particular for controlling the preparation device. In particular, a completion time for the food can advantageously be determined on the basis of the time-dependent analysis of the analysis information.

The time-dependent analysis is preferably an analysis of temporally successive (acquisition) values, preferably a time series. The time-dependent analysis particularly preferably comprises statistical methods for forecasting the future development of the time series and/or acquisition values of different recordings and/or the acquisition variables. In this case, a prediction provides the advantage that the control signal can be emitted in due time, despite a long latency period, i.e. a delay between the preparation state occurring and the corresponding analysis result being provided. The time-dependent analysis therefore provides the advantage that a future completion and/or other desired state in the preparation of the food can be identified or determined reliably and early. This makes it possible to influence the preparation early on, in order to be able to deactivate the preparation mode in due time for example. In other words, the control signal is preferably used to maintain a preparation state which temporally follows the preparation state for which the particular analysis result is specific. The time-dependent analysis, which is also performed in a time-limited and/or real-time capable manner for example, can thus perform and/or initiate the influencing of the preparation mode and/or the determination of the preparation state and/or the prediction of the desired completion time before the completion time has been temporally reached and/or exceeded.

It is furthermore conceivable for the food processor to comprise at least one and/or at least two and/or at least three and/or more preparation devices which preferably each comprise at least one processing tool, preferably at least one mixer and/or at least one heating element. The processing tool preferably comes into direct contact with the prepared food. In particular, each preparation device can comprise one sensor, respectively, the sensors for example differing from one another in each case, for example in order for it to be possible to identify a different acquisition variable in each case. It may furthermore be possible for the preparation device to comprise at least one electric motor (e.g. electromotor), preferably for operating the mixer. In addition, the preparation device can preferably comprise at least one temperature sensor and/or at least one scales and/or at least one current sensor and/or at least one voltage sensor, wherein it also is possible for the preparation devices to be designed differently from one another in each case. For example, a first preparation device is provided which comprises the mixer, and a second preparation device is provided which in particular comprises the heating element and/or the temperature sensor. Furthermore, the food processor preferably comprises a housing which comprises a holder for a mixing vessel. The mixing vessel can for example be closed by a lid and in particular comprises a handle. The food to be prepared can in particular be poured into and/or received in the mixing vessel. The mixer and/or the heating element are preferably arranged in the inside of the mixing vessel, and can in particular act on the food in the mixing vessel. It may also be possible for the food processor to comprise at least one control panel which preferably comprises at least one display, preferably a touchscreen. In this place, the display is used for example as an input and/or output means for a user of the food processor. Further input means such as a rotary control and/or a set switch and/or the like may optionally also be provided. A user of the food processor can set and/or activate and/or deactivate for example control parameters and/or operating parameters, such as the mixer speed and/or the heating temperature and/or the time period for the mixing process (mixing duration) and/or different programs for the preparation by means of the control panel, in particular by means of the display in conjunction with the further input means. It is also conceivable for the control panel and/or the food processor to be designed such that the operating parameter to be set and/or a recipe selection can be selected using the touchscreen and/or such that the value for the selected operating parameter and/or a specific recipe can be set/selected using the further input means.

It is furthermore possible in particular for the user to be able to set the food (i.e. in particular the type of food) and/or the preparation and/or the recipe for the food processor by means of the control panel. It may furthermore be possible for the user to be able to activate and/or deactivate the preparation mode of the food processor, in particular using the control panel and/or the further input means. In preparation mode, for example the mixer and/or a motor for operating the mixer is started, preferably for a specified temporal mixing duration. The preparation mode for example can be deactivated at the latest following said specified mixing duration, as a result of which the operation of the mixer and/or of the motor is also ended. Preferably, when preparation mode is activated the mixer speed is greater than 0 and when preparation mode is deactivated the mixer speed is 0. In this case, the deactivation of the preparation mode and/or the setting of preparation parameters and/or operating parameters such as the mixer speed and/or the duration of the mixing process can take place for example manually and/or (partially) automatically, for example in a program-controlled and/or recipe-dependent manner (for example on the basis of the recipe selected) and/or in a food-dependent manner (e.g. on the basis of the state of the food). This thus in particular allows for the at least partially automatic preparation of the food.

It is furthermore conceivable for the acquisition variable and/or the preparation parameter (and/or the control parameter) to correspond to the operating parameter and/or to comprise the operating parameter, and/or for the acquisition variable and/or the acquisition value to be dependent on the operating parameter. Each recipe and/or each food that is set preferably comprises at least one (digitally stored) program for the preparation process.

The food processor and/or a mobile device (such as a mobile memory or recipe chip) for the food processor preferably comprises a non-volatile memory unit in which preparation parameters and/or a comparison specification and/or an acquisition variable selection and/or pre-set operating parameters and/or programs and/or recipes are stored which are selected for example on the basis of input by the user. Alternatively or in addition, it is possible for a comparison specification to comprise information regarding a recording type selection (type of the relevant recording), in particular the comparison specification being selected on the basis of the food that has been set, and for example (e.g. in step a) and/or b)) for the recordings to be identified that are specified by the recording type selection of the selected comparison specification, such that at least one different recording is identified when a first food to be prepared is selected than when a second food to be prepared is selected.

In this case, said operating parameters in particular also comprise control parameters, for example the mixer speed and/or the values for electrical parameters for controlling the motor of the mixer, in order to achieve a specified mixer speed. In this case, the preparation parameters preferably comprise the operating parameters and/or control parameters and/or further parameters at least in part, which parameters are relevant for the preparation. In particular, the preparation parameters each comprise information regarding, for example:
    properties of the food processor and/or the control and/or acquisition variables and/or physical variables that are relevant for the preparation of the food and/or that are dependent on a preparation state;
    the type of the acquisition variables to be acquired, for example a motor signal of the motor of the mixer, which is in particular dependent on the control of the motor and/or on the speed and/or the torque of the mixer,
    the number of acquisition variables to be acquired.

Preferably, the preparation state, within the context of the invention is to be understood as the state of the food during preparation and/or characteristics of the preparation, such as an optimal future completion time of the preparation and/or of the food. The analysis result is therefore preferably specific for the preparation state, i.e. the analysis result in particular makes it possible to conclude the state of the prepared food at the timepoint the measurement values were identified and/or how the preparation can be influenced in order to achieve an optimal result.

For example, a completion time for the preparation can be estimated on the basis of the analysis result and the duration of the mixing process can thus be adjusted and/or the mixer speed can be adjusted. The speed may for example be and/or vary in a range of from 10 rotations per minute (rpm) to 600 rpm, preferably between 40 rpm and 500 rpm. The mixing duration can for example be set in a range between 10 seconds and 1000 seconds, preferably 20 seconds to 400 seconds. This allows for the optimal preparation of a plurality of different foods.

It may in particular be possible for the preparation to be performed on the basis of input by a user of the food processor and/or programming of the food processor. In this case, it is conceivable for example for the user to set on and/or input into the food processor the type of food that is to be prepared. This may for example also take place by means of the user selecting a particular recipe. Subsequently, it may be possible for a particular comparison model and/or a particular acquisition variable selection and/or a particular program and/or particular values for operating parameter and/or control parameters for the at least partially automatic preparation by the food processor to be loaded and/or set and/or read out on the basis of the food type. In particular, at least one specification, such as the type and/or the number and/or the selection of the acquisition variables to be acquired, can also be determined, directly or indirectly, by means of selecting the recipe and/or by means of the user input and/or on the basis of the food type. For this purpose, the specifications and/or programs and/or values are for example stored digitally in a non-volatile memory unit, in particular of the food processor and/or of a mobile device. This can make it possible to program the food processor in a flexible manner for different food types.

In this case, the food and/or the food type is for example cream and/or rice and/or flour, and therefore for example a first food, in particular cream, and/or a second food, in particular rice, can be provided for the preparation and/or according to the programming. Different time-dependent analyses and/or different parameterization for the time-dependent analysis can also be used, depending on the type of food. It may also be possible for different acquisition variables to be acquired and/or for characteristic curves of the analysis information and/or of the analysis result to be specified and/or to be able to be read out and/or compared on the basis of a food selected by the user, said variables and/or curves being specific for the particular food in each case. It is thus possible, for example, for a first curve of the analysis information or of the analysis result to be provided and/or evaluable for a first food, said first curve being characteristic of said first food, and for a second curve of the analysis information or of the analysis result to be provided and/or evaluable for a second food, said second curve being characteristic of said second food. Furthermore, it is preferably possible to determine a first selection (i.e. in particular type and/or number) of acquisition variables for a first food and a second selection of acquisition variables for a second food, which variables are intended to be acquired. Moreover, it is preferably possible for the characteristic curve to be determined on the basis of the selection of the acquisition variables. The evaluation of the corresponding characteristic curve, e.g. by comparing the characteristic curve with the identified curve of the measurement values and/or with the analysis result then makes it possible to draw conclusions on the state of the food in question, with the result that, for example on the basis thereof, the control signal is emitted, for example as a binary and/or electronic signal. For example, in the case of cream the preparation mode is influenced, in particular deactivated, when an increasing curve of a motor signal of the mixer is ascertained by the time-dependent analysis and/or on the basis of the analysis result of the time-dependent analysis. In the case of rice, the preparation mode is preferably influenced, in particular deactivated, when a falling curve of the motor signal is detected by the time-dependent analysis and/or on the basis of the analysis result of the time-dependent analysis. The advantage of this is that different foods can be optimally prepared in a flexible manner using the time-dependent analysis.

It may preferably be possible for the following steps to be performed, in particular after determining the analysis information and/or during the analysis:

a) generating at least one feature on the basis of the analysis information, b) comparing a first value of the analysis information and/or of the generated feature with a comparison specification and/or with a second value of the analysis information and/or of the generated feature, c) determining a positive or negative decision result on the basis of the analysis result, the positive decision result being determined only when the analysis result indicates a specified preparation state, and the control signal being emitted only when the particular decision result is positive.

It is furthermore possible for filtering of the identified recordings and/or of acquisition values of the recordings, in particular the first and/or second and/or further acquisition values, to be performed, preferably in order to generate features. In this case it is possible in particular for at least one of the following filtering methods to be carried out individually or in combination (directly or indirectly) on the identified acquisition values (in particular measurement values) in order to filter the identified acquisition values, in particular an acquisition value curve of the temporally successive acquisition values:

median filter moving average first and/or second and/or at least fourth-order low pass filter.

The filtering of the identified recordings and/or acquisition values (i.e. the unfiltered identified acquisition values) is preferably carried out such that filtered identified acquisition values are determined by means of the filtering. In particular, the analysis information is determined on the basis of the filtered identified acquisition values. In this case, the filtering preferably comprises a first filtering process for identified first acquisition values and/or a second filtering process for identified second acquisition value, such that filtered identified first and/or filtered identified second acquisition values are determined by means of the filtering. Particularly preferably, the (first) filtering method of the first filtering process differs from the (second) filtering method of the second filtering process, in particular on the basis of the (type of the) relevant (first and/or second) acquisition variable. This allows for the analysis to be further improved, in particular by reducing the influence of errors and thus optimizing the preparation.

It is furthermore conceivable for filtering of the identified recordings and/or acquisition values and/or generation of at least one feature to be performed on the basis of the identified acquisition values and/or on the basis of the analysis result. The filtering and/or the generation of the feature and/or the determination of the analysis information and/or the time-dependent analysis preferably comprises (numerical) determination of a difference and/or of a gradient, and/or a comparison of (e.g. adjacent) filtered and/or unfiltered identified acquisition values (i.e. for example also first and second acquisition values). In this case it is conceivable for the filtering and/or the determination of the analysis information, and/or the generation of the features to be performed on the basis of the time curve of the (e.g. first and/or second) acquisition values, i.e. on the basis of for example at least 2 and/or at least 4 and/or at least 5 and/or at least 10 and/or at least 100 (adjacent, identified first and/or second) acquisition values in each case. It is thus possible to create a reliable information base for the analysis.

The time-dependent analysis preferably evaluates the time curve which may for example comprise first and/or second recordings and/or acquisition values that were each identified in a time interval of more than at least 1 s and/or at least 2 s and/or at least 5 s and/or at least 10 s (by means of the acquisition). In particular, steps of the method according to the invention can be carried out in temporal succession or in any desired sequence and/or repeatedly. In this case, at least one of said steps and/or the filtering and/or the generation of the features (feature generation) can for example be software- and/or computer-implemented and/or performed electronically and/or by means of an electronic, in particular integrated, circuit. It may in particular be possible for digital and/or discrete acquisition values to be evaluated for the filtering and/or time-dependent analysis. Alternatively or in addition it may be possible for the time-dependent analysis and/or at least one of the steps of the method according to the invention to be carried out repeatedly and/or cyclically, in particular over the entire preparation process, in order to determine the analysis result repeatedly and/or cyclically in each case. In particular it may be possible for the time-dependent analysis and/or at least one of the steps of the method according to the invention to be carried out at least once per second and/or at least ten times per second and/or at least one hundred times per second during the preparation mode, i.e. during the preparation. It is furthermore possible, for example, for at least one of the steps of the method according to the invention to be carried out by a processing device at least in part, preferably by means of arithmetic operations and/or a signal processing. In this case, said steps ensure that the preparation of the food can be influenced reliably in order to achieve optimal preparation results It is furthermore conceivable for at least one threshold value to be evaluated, in particular in at least one of the steps of the method according to the invention, in particular in order to check the plausibility of the analysis result, preferably at least one comparison value, such as at least one identified and/or filtered (first and/or second) acquisition value and/or at least one generated feature and/or the analysis result and/or a temporal mixing duration being compared with the threshold value. The threshold value can preferably be dependent on the type and/or number of the acquired acquisition variables. The threshold value may for example comprise an upper and a lower threshold value, i.e. a threshold value range defined thereby. For example, it may be provided for a positive decision result to be determined and/or for a control signal for deactivating the preparation mode to be emitted only if the comparison value is less than the upper threshold value and/or greater than the lower threshold value. It is thus for example possible to prevent disadvantages during the preparation on account of ambiguous analysis results.

It is furthermore conceivable for a comparison specification, preferably having a time curve pattern, to be evaluated for the analysis. Alternatively or in addition, a gradient of the recordings and/or acquisition values and/or a time curve of the (filtered or unfiltered) recordings and/or (filtered or unfiltered) acquisition values (acquisition value curve) and/or averages of the curve and/or the like is also evaluated during the analysis in order to determine the analysis result for example. The comparison specification preferably comprises a specified pattern, in particular a time curve pattern and/or a specified characteristic curve of the analysis information and/or of a frequency distribution. In particular a pattern recognition and/or a feature generation is used for a comparison with the comparison specification during the analysis. The generation of the features (feature generation) comprises for example a calculation of a temporal difference and/or a variance and/or a trend (for example in relation to a drop or rise in the curve or acquisition value curve).

It is furthermore conceivable for a selection of the comparison specification to be performed in that the comparison specification is read out from a database on the basis of a food that has been set, the database preferably being provided locally and/or in a cloud-based manner via a network and/or the Internet by means of a computer that is remote (e.g. arranged so as to be spatially remote) from the food processor, and/or by means of an (in particular) mobile memory unit. For example, a USB stick and/or another portable memory means is also understood as a mobile memory unit, which unit can for example be inserted into the food processor and/or connected to the food processor. It is thus for example possible to provide new comparison specifications for the food processor in a flexible manner. In particular, the comparison specification can be selected for example on the basis of a food that has been pre-set and/or provided for preparation, and/or in a recipe-dependent manner (i.e. for example on the basis of a digitally stored recipe for automatic preparation of the food). In this case, the database is for example a system for electronic data management, preferably software-based. In this case it may in particular be possible for the comparison specification to be selected during the execution of a recipe, e.g. at a specified point of the recipe.

The food that is prepared and/or to be prepared (i.e. provided for preparation and/or poured into the food processor) can preferably comprise at least one of the following foods, wherein a comparison specification is selected and/or an acquisition variable selection is performed on the basis of the food for example:

pasta,
rice,
whipped cream,
dough,
sauces and/or emulsions,
ice mass.

A first and at least one second threshold value may optionally also be provided, wherein a first threshold value preferably is evaluated for or compared with the first acquisition value, e.g. a first recording, and a second threshold value preferably is evaluated for or compared with the second acquisition value, e.g. a second recording. It is also conceivable for the first and second or alternatively an upper and lower threshold value to be provided, which in particular define a value range. In other words, for example a decision is carried out, i.e. the decision result is determined, and/or a positive decision result is determined and/or taken into account only if the (first and/or second) acquisition value and/or the generated feature is lower than an upper (first) threshold value and/or greater than a lower (first) threshold value. Preferably (as an additional condition), the decision is carried out and/or a positive decision result is determined and/or taken into account only if the mixing duration is less than an upper (second) acquisition value and/or greater than a lower (second) threshold value. As a result, the period of time for carrying out the decision is thus defined by the second threshold value, wherein the threshold values for example are empirically defined and/or are food-dependent (i.e. for example defined on the basis of a food selected and/or set by the user) and/or acquisition variable-dependent (i.e. on the basis of the type of acquisition variable). This makes it possible in particular to assign each of the acquired acquisition variables a specific upper and lower threshold value in each case in order to thus further improve the preparation.

The threshold values are stored in a digitally persistent manner, for example in a non-volatile memory unit such as a ROM (read only memory) or a flash memory, and can be read out for a corresponding food. The mixing duration can for example be identified in that an (electronic) timer is started when the preparation mode is activated and/or when the mixer speed is increased, and/or is read out when the recordings and/or acquisition values are identified and/or during at least one of the steps of the method according to the invention. It is thus possible to reliably check the plausibility of the analysis result. In this case, the first and/or second and/or upper and/or lower threshold value can for example be in a range between 1 second and 5000 seconds, in particular 10 seconds to 1000 seconds, preferably 20 seconds to 400 seconds. The threshold values can preferably be defined empirically in that the (lower) threshold value and/or a (lower) first and/or a (lower) second threshold value specifies the particular value or the mixing duration at which (defined empirically) the desired preparation state (e.g. the desired consistency of the food) occurs at the earliest. Furthermore, the threshold values can preferably be defined empirically in that the (upper) threshold value and/or an (upper) first and/or an (upper) second threshold value specifies the particular value or the mixing duration at which (defined empirically) the desired preparation state (e.g. the desired consistency of the food) occurs at the latest. In addition to the threshold values, in particular also further identified values such as temperature values and/or weight of the food can be evaluated for the plausibility check. In particular, the plausibility check is performed at the latest when a decision is carried out and/or a positive decision result is output only if the plausibility check is positive, i.e. the limits specified by the threshold values are satisfied.

It may be advantageous if, within the context of the invention, the time-dependent analysis comprises a time series analysis, preferably a (statistical) evaluation of the frequency distribution, for this purpose in particular the analysis information and/or the identified recordings and/or acquisition values and/or the frequency distribution are temporally buffered, the time-dependent analysis and/or the time series analysis preferably are performed in a real-time capable manner. The term "real-time capable" preferably refers to the fact that the analysis result is determined by the time-dependent analysis at the latest within a predefined maximum time period. A "soft" or alternatively also "firm" real-time requirement is thus preferably provided in preparation mode in order that the preparation mode can be influenced in due time. According to the soft real-time requirement, the analysis result is processed further or the decision result is positive only if the predefined maximum time period has been adhered to and/or has not been reached. In order to ensure a particularly fast processing, a temporal buffering is preferably provided, in particular by means of a fast cache memory. The time series analysis for example comprises performing a frequency analysis and/or an auto-correlation function and/or an interference statistical analysis and/or a trend analysis and/or an analysis of a difference or rise in the temporal (acquisition value or record) curve.

The monitoring device in particular comprises an acquisition device in order to identify recordings and/or acquisition values and/or to acquire acquisition variables at the drive means for example. For this purpose, the monitoring device can also comprise at least one or more sensors which are integrated in the food processor and/or arranged on the food processor. In this case, the sensor and/or the sensors can be designed for example as temperature sensors and/or voltage sensors and/or current sensors and/or speed sensors and/or torque sensors. Accordingly, the recordings and/or acquisition values are formed as voltage acquisition values and/or current acquisition values and/or torque acquisition values and/or speed acquisition values and/or temperature acquisition values. This is advantageous in that the relevant acquisition values can be identified in a reliable manner.

Preferably, a third sensor for acquiring a third acquisition variable and/or a fourth sensor for acquiring a fourth acquisition variable and/or further sensors for acquiring further acquisition variables is also provided. Preferably, all the recordings and/or acquisition values that were identified by means of acquiring all the acquisition variables are used for determining the analysis information, in order that the preparation can be adjusted in a particularly stable and reliable manner by means of consulting as may acquisition variables as possible.

According to a further advantage, it may be possible for the processing device and/or the monitoring device to be integrated in the food processor, and in particular for the recordings and/or acquisition values to be identified directly by means of acquiring the acquisition variables at the preparation device inside the food processor. For example, the processing device and/or the monitoring device may be arranged inside a housing (and/or on the housing at least in part) of the food processor and/or may be rigidly connected to further components of the food processor. The relevant acquisition variable can be acquired for example by means of a motor current of a motor of a mixer of the food processor being measured. A voltage tap and/or a shunt resistor for example, in particular as a first sensor, may be provided on an electrical line of a drive means of the food processor in order to acquire for example a first acquisition variable such as the motor current. A second sensor may for example be designed as a temperature probe, in order to acquire a second acquisition variable such as a temperature for example. The advantage of this is that the recordings and/or acquisition values can be identified, and thus a preparation state can be identified, in a simple manner.

It is furthermore conceivable for the monitoring device to comprise an electrical and/or electronic processing device, and/or for the processing device and/or the monitoring device to comprise at least one electronic component. The electronic component for example comprises a microprocessor and/or a digital signal processor and/or a non-volatile memory and/or an application-specific integrated circuit (ASIC) and/or a field-programmable gate array (FPGA) and/or the like. This allows for the time-dependent analysis to be performed in a quick and reliable manner. In particular, the electronic component and/or a sensor that is connected to the monitoring device or integrated therein optionally also comprises an analogue-to-digital converter which is used for acquiring the acquisition variable for example.

The invention also relates to a computer program product for operating a food processor, in particular a food processor according to the invention. In this case, the computer program product is intended to be configured to carry out a method according to the invention. As a result, the computer program product according to the invention provides the same advantages as have been described in detail with reference to a method according to the invention and a food processor according to the invention. In addition, a computer program product according to the invention may also be suitable for being read out and/or executed by a processing device of a food processor according to the invention, in particular in order to carry out the method according to the invention. A computer program product according to the invention is for example a firmware which is preferably used for operating the food processor according to the invention and/or can be digitally transferred to the food processor or the memory unit and/or processing device. Furthermore, the computer program product according to the invention may also be configured as a digital storage medium, in particular as a flash memory and/or a digital optical storage medium such as a CD and/or DVD and/or Blu-ray.

It may furthermore be possible, within the context of the invention, for a preparation recording of the preparation to be made or created (in particular by means of the monitoring device), at least during the preparation mode and/or in the case of preparation (of or during the preparation mode) that is to be recorded. For this purpose, further acquisition values and/or further recordings of the prepared food and/or at least one control value and/or at least one result value are identified (during the preparation) (for example repeatedly and/or cyclically and/or as a one-off). The at least one control value is identified for example by means of acquiring acquisition values of at least one control parameter, the control parameter being specific for the preparation (to be recorded). The at least one result value is identified for example by means of acquiring result values of at least one result parameter, the result parameter being specific for the result of the preparation and/or for the preparation. Subsequently, the identified control value and/or the identified result value can in particular be recorded in a preparation recording (e.g. in the form of digitally and/or persistently stored information), such that said recording is preferably assigned (in the form of a recorded preparation) to the preparation to be recorded. In this case, the acquisition value comprises for example at least one acquisition value and/or at least one recording of the prepared food. The control parameter comprises for example at least one acquisition variable and/or at least one variable and/or user input and/or the like that is acquired by a sensor of the food processor. The result value in particular comprises at least one acquisition value and/or at least one recording of the prepared food. The result parameter preferably comprises at least one acquisition variable and/or at least one user input and/or at least one variable that is acquired by a sensor of the food processor. In this case, the control parameter and the result parameter particularly preferably differ from one another. This is advantageous in that preparation can be recorded and in particular reproduced at a later timepoint. For this purpose, it is in particular possible for the control parameters, which are used in particular for controlling the preparation, to be acquired as comprehensively and/or completely as possible and to preferably be able to be recorded and/or reproduced by the control values. In this case, the result value and/or the result parameter is used in particular for recording and/or reproducing the result of the recorded preparation, e.g. a state of the prepared food.

In this case, the control parameter is in particular a parameter of the kind, in particular an acquisition variable of the kind, that comprises information regarding the specific preparation, in particular the control of the preparation and/or of a single preparation step of the preparation. The control parameter thus for example comprises information regarding a speed of a mixer of the food processor and/or a direction of rotation (e.g. anti-clockwise or clockwise rotation) of the mixer, and/or regarding a set temperature of a heating element or a heating means of the food processor, and/or regarding a preparation duration, in particular of a single preparation step. For example, when preparing fried onions the control parameter influences the degree of roasting of the onions because for example the temperature for heating the onions and/or the duration of the heating is determined thereby. In this case, the result parameter is preferably specific for the result of the preparation, e.g. the degree of roasting of the onions. The result parameter can therefore be, for example, a visual recording of the food, e.g. by means of a camera sensor, and/or another physical variable of the food processor, e.g. a motor current. For example, the consistency of the food, such as whipped cream, can be checked on the basis of the motor current. It is also conceivable for the result parameter to relate to user input, e.g. for shortening the preparation time. It may be possible, for example, for the preparation time specified by the recipe to be shortened by means of user input when the desired degree of roasting is achieved. Accordingly, the result parameter, for example, may comprise a user-specific adjustment of this kind. It is also conceivable for the result parameter to relate to an adjustment owing to acquired environmental parameters, which adjustment is performed automatically for example, in order to optimize the preparation under different environmental conditions.

It may furthermore be possible that, in order to reproduce the recorded preparation, the preparation recording is first evaluated, in particular when a further preparation mode is initiated for a further preparation, and preferably when a recipe selection is made. Furthermore, a control signal can subsequently be emitted, in particular on the basis of the evaluation and/or of the preparation recording, such that the further preparation takes place in a manner adjusted to the preparation recording. In particular, the result of the recorded preparation and/or at least one preparation step of the recorded preparation and/or a curve of control parameters of the recorded preparation can thus be reproduced.

Further advantages, features and details of the invention can be found in the following description, in which embodiments of the invention are described in detail with reference to the drawings. In this case, the features mentioned in the claims and in the description may in each case be essential to the invention alone or in any desired combination. In the drawings:

In the following drawings, identical reference signs are used for the same technical features, even in different embodiments.

Figure 1:
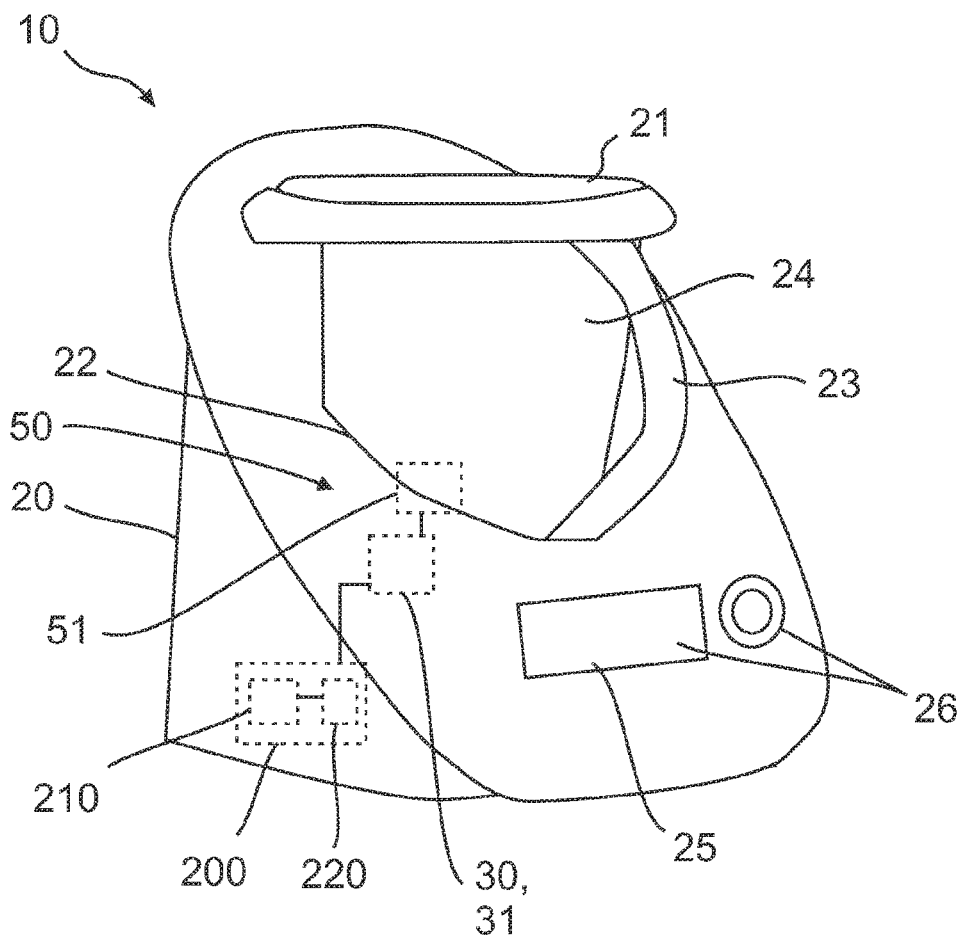
FIG. 1 is a schematic view of a food processor according to the invention.
Figure 2:
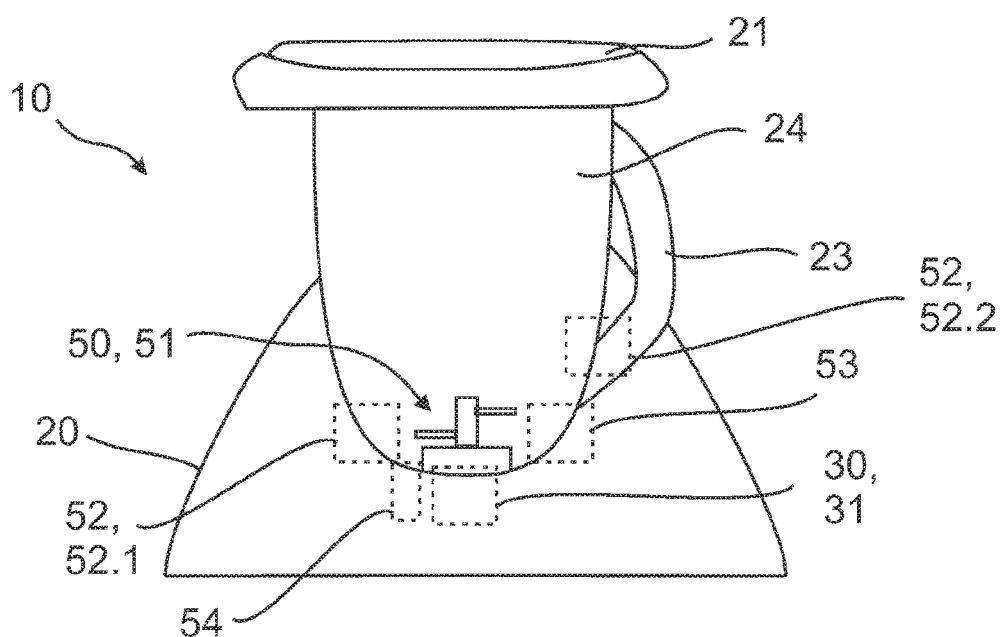
FIG. 2 is a further schematic view of a food processor according to the invention.

A food processor 10 according to the invention is shown schematically in FIGS. 1 and 2. The food processor 10 comprises a housing 20 which comprises a holder 22 for a mixing vessel 24. In this case, the mixing vessel 24 can for example be closed by a lid 21 and preferably comprises a handle 23. A mixer 51 and/or a heating element 53 and/or at least one sensor 52 is preferably arranged in the region of the mixing vessel 24 and/or in the inside of the mixing vessel 24. Furthermore, a first sensor 52.1 and a second sensor 52.2 may also be provided, which sensors are each arranged for example at different regions of the food processor 10, inside or outside the food processor 10, for acquiring different acquisition variables 102. Moreover, the food processor 10 comprises a control panel 26 which for example comprises a display 25, preferably a touchscreen 25. In this case, the display 25 is used in particular both as an input means and as an output means. The control panel 26 in particular makes it possible for a user of the food processor 10 to set and/or activate and/or deactivate control parameters and/or operating parameters, such as the mixer speed, the heating temperature and/or the time period for the preparation or the mixing process, and/or different programs of the food processor 10. Furthermore, the display 25 can also output recipe-related instructions and/or advice and/or graphical operating elements. The food processor 10 according to the invention can be operated by means of the graphical operating elements, as input means, which elements are preferably part of a graphical user interface. The recipes are for example stored in a non-volatile memory 220 of the food processor 10. In particular, the input means also allows for a preparation mode to be activated and/or deactivated, and/or for the type of preparation, and/or the type of food to be prepared, and/or (directly or indirectly) the type or number of acquisition variables 102 to be acquired, to be set.

As shown in FIGS. 1 and 2, the food processor 10 comprises at least one preparation device 50, which in particular comprises at least one processing tool 51, such as a mixer 51. For the purpose of monitoring and/or control 160, in particular of the preparation devices 50, at least one monitoring device 200 is furthermore provided, which device for example comprises a processing device 210 and/or the memory 220. It may furthermore be possible for the preparation device 50 and/or further preparation devices 50 to comprise the at least one sensor 52 and/or a heating means 53 and/or a scale 54 which are integrated in the food processor 10 for example. The scale 54 is used in particular for acquiring or measuring a weight force on the mixing vessel 24. For this purpose, the object to be weighed is for example placed on and/or poured into the mixing vessel 24. The heating means 53 is for example designed such that the food can be heated in the mixing vessel 24 by the heating means 53, preferably up to temperatures in a range of from 10° C. to 150° C., preferably 30° C. to 120° C.

FIG. 2 furthermore schematically shows a drive means 30 of the food processor 10, which drive means comprises an (electric) motor 31. In this case, the drive means 30 and/or the motor 31 is connected to at least one preparation device 50 and/or to at least one processing tool 51, in particular the mixer 51, such that force transmission takes place from the motor 31 and/or a drive shaft of the drive means 30 to the preparation device 50 and/or the processing tool 51 and/or the mixer 51. Provision may be made for the monitoring device 200 to be electrically connected at least to the sensor 52 and/or to the preparation device 50 and/or to the drive means 30 and/or to the motor 31 of the drive means 30 for the purpose of monitoring.

Figure 3:
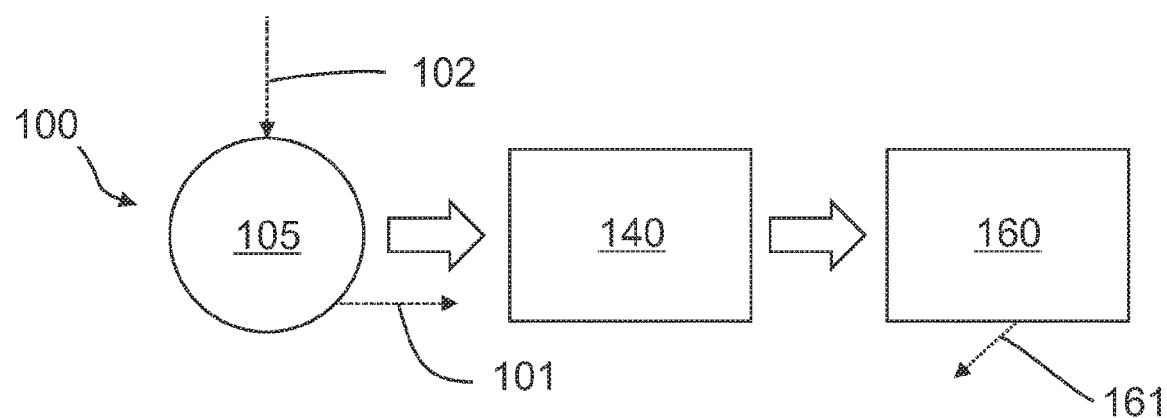
FIG. 3-8 are schematic views for illustrating a method according to the invention.

FIG. 3 schematically illustrates a method 100 according to the invention. In this case, according to a first method step, at least one acquisition 105 of at least one or two acquisition variables 102 specific for a preparation state is performed on the food processor 10. In this case, the acquisition 105 (of the acquisition variable 102) identifies temporally successive recordings 101 (having acquisition values 106 in each case), for example the recordings 101 (and/or the acquisition values 106) being specific for at least one acquisition variable 102, in particular a preparation parameter, of the food processor 10, i.e. for example being dependent on the motor current of the motor 31 of the drive means 30 of the food processor 10. Subsequently, in particular a time-dependent analysis 140 of at least one item of analysis information is carried out, wherein the analysis information is determined on the basis of the temporally successive recordings 101 (and/or acquisition values 106).

In this case, an analysis result of the time-dependent analysis 140 influences a control operation 160, in particular of the preparation device 50. In this case, at least one control signal 161 is emitted, on the basis of the analysis result, which signal influences the preparation mode, i.e. for example the operation of the preparation device 50. In this case, the control signal 161 is emitted for example by a processing device 210 and/or by the monitoring device 200 and/or by a control device (not shown).

Figure 4:
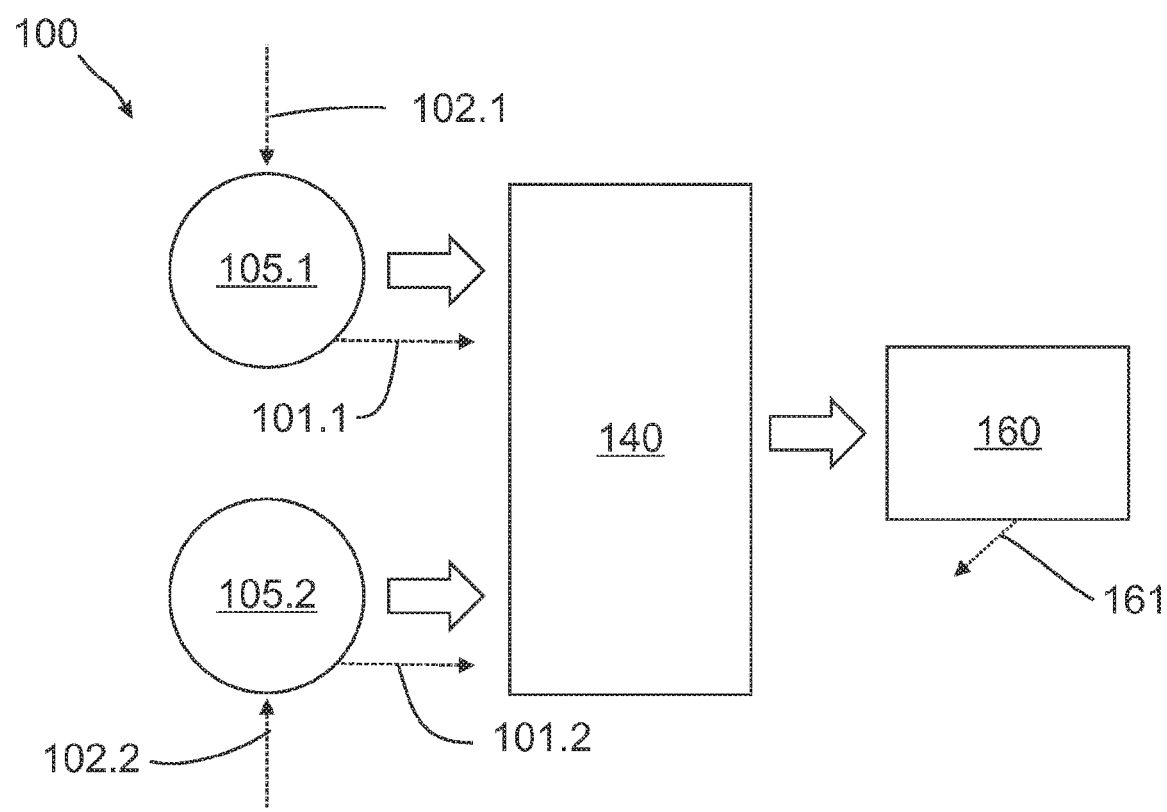

FIG. 4 schematically illustrates a method according to the invention, by way of example. In this case, at least one first recording 100.1 of the prepared food is identified at at least one first timepoint 108.1 of the preparation, by means of a first acquisition 105.1 of a first acquisition variable 102.1. Furthermore, at least one second recording 101.2 of the prepared food at at least one second timepoint 108.2 of the preparation is identified by means of a second acquisition 105.2 of a second acquisition variable 102.2, which may for example also be identical to the first acquisition variable 102.1. Subsequently, in particular the analysis information is determined on the basis of the first recording 101.1 and/or the second recording 101.2, and the analysis 140 of the analysis information is performed.

Figure 5:
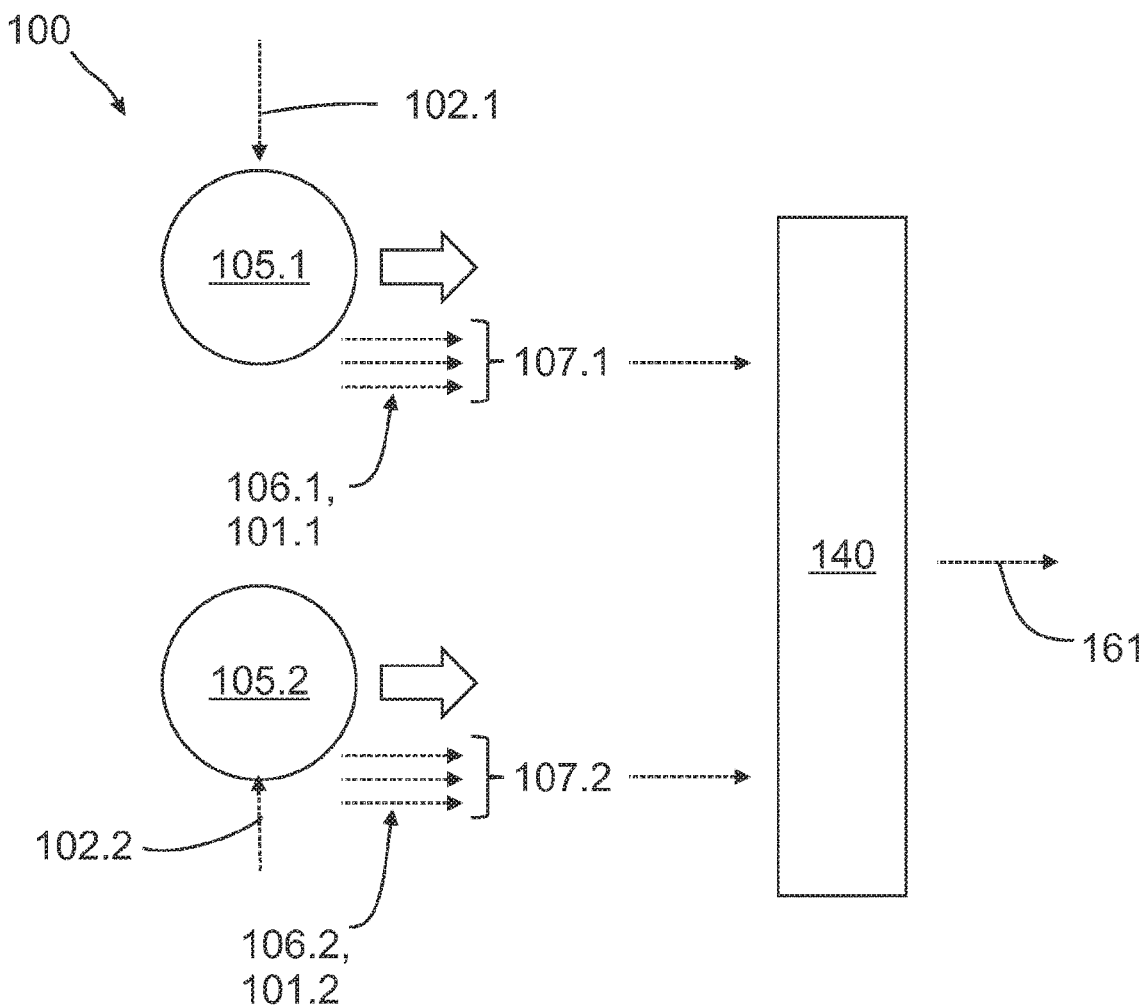

According to FIG. 5, a first curve 107.1 can also be determined (e.g. by means of temporary storage) from the first recording 101.1, which for example comprises first acquisition values 106.1. Furthermore, a second curve 107.2 can also be determined from the second recording 101.2 and/or from the second acquisition values 106.2 of the second recording 101.2. In this case, it is preferably possible for the analysis information for the analysis 140 to be determined on the basis of the first and/or second curve 107.1, 107.2.

Figure 6:
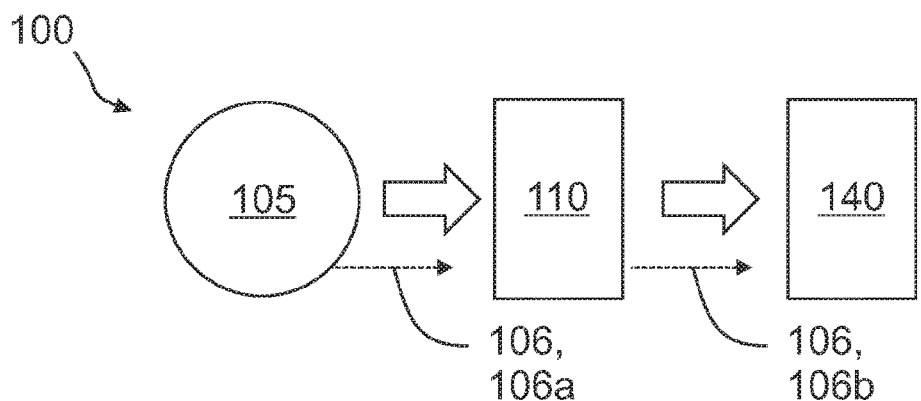

FIG. 6 shows that, following an acquisition 105 for identifying the recordings 101 (comprising the respective acquisition values 106), the acquisition values 106 of the recordings 101 may undergo further signal processing in order in particular to determine analysis information as a result thereof. During the signal processing, for example filtering 110 of the identified (unfiltered) acquisition values 106, 106*a* is first performed, as a result of which the filtered acquisition values 106, 106*b* are determined. This for example also makes it possible to smooth a time curve 107 of the acquisition values 106. Subsequently, it may be possible for evaluation of the filtered acquisition values 106*b* to be performed, preferably generation of features 121 and/or a feature evaluation. For the evaluation of features, it is possible for example to compare the generated features 121 with a threshold value 171 and/or to perform a frequency analysis. Subsequently, for example a time-dependent analysis 140 is performed on the basis of the filtered (identified) acquisition values 106, 106*b*.

Figure 7:
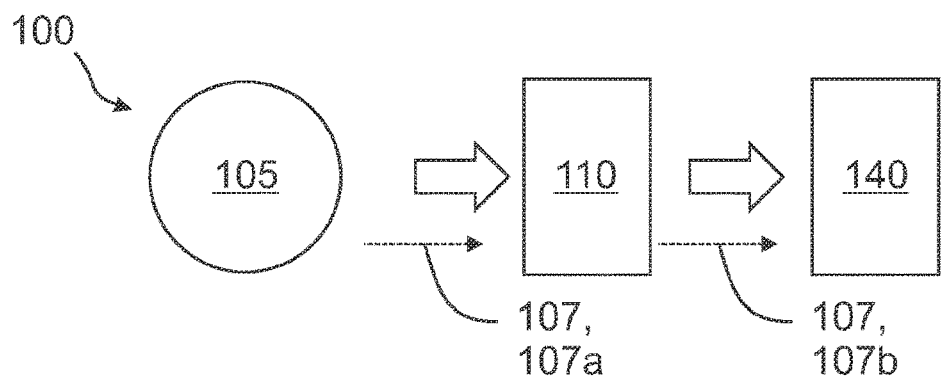

It is also conceivable for filtering of the time curve 107 of the recordings 101 and/or acquisition values 106 to be performed alternatively or in addition. This is shown schematically in FIG. 7, on the basis of an unfiltered curve 107*a* of unfiltered acquisition values 106*a*. In this case, the unfiltered acquisition values 106*a* are identified for example by means of acquisition 105 of a measurement variable M as the acquisition variable 102, for example a motor signal. In order to smooth the unfiltered acquisition values 106*a*, a filtering 110 of the curve 107 may be performed, as a result of which a filtered time curve 107*b* is identified. In this case, the filtering 110 allows for an improved and more reliable evaluation of the acquisition values 106 and/or of the curve 107, for example by means of the time-dependent analysis 140.

Figure 8:
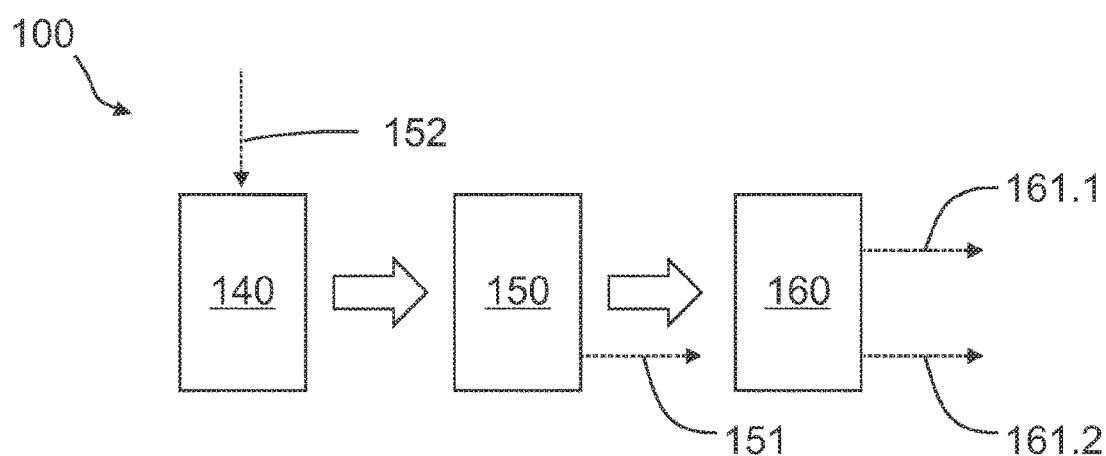

The time-dependent analysis 140 can for example be performed on the basis of the filtered time curve 107b and/or on the basis of the unfiltered time curve 107a and/or on the basis of the generated features 121 and/or on the basis of the filtered acquisition values 106b and/or on the basis of the unfiltered acquisition values 106a. The time-dependent analysis 140 is preferably a frequency analysis. As shown in FIG. 8, a positive or negative decision result 151 is determined on the basis of an analysis result of the time-dependent analysis 140, a decision 150 being carried out for this purpose.

In particular, a positive decision result 151 is determined only when the analysis result indicates a (desired) specified future preparation state, for example an optimal completion time of the preparation. In this case, in the event of a negative decision result 151, the preparation mode is not influenced and/or no control signal 161 is emitted. In other words, the preparation of the food continues as normal in the preparation mode. In particular, however, there can moreover also be further abortion conditions for the preparation mode, such that the preparation mode is automatically deactivated for example when a maximum time period of the preparation mode is exceeded, irrespective of the analysis result. After the negative decision result 151 has been determined, at least one acquisition 105 and/or one time-dependent analysis 140 is performed again (for example automatically and/or after a specified time period and/or cyclically). However, if a positive decision result 151 is determined, the preparation device 50 is controlled 160, by means of a control signal 161 being emitted, in order to influence the preparation mode (see FIG. 8). In order to carry out the decision 150, in addition at least one threshold value 171 can also be consulted for the plausibility check.

FIG. 8 furthermore shows that at least a first and a second control signal 161.1, 161.2 can be emitted, which signals differ from one another for example with respect to the type of control. It is in particular possible in this case for the first control signal 161.1 to be emitted, when a first analysis result is determined, such that the preparation is influenced in a first manner, in particular by reducing a speed of a mixer 51 of the food processor 10 in a time-critical portion of the time-dependent analysis 140, and for the second control signal 161.2 to be emitted, when a second analysis result is determined, such that the preparation is influenced in a second manner which differs from the first manner, in particular by terminating the preparation mode.

Figure 9:
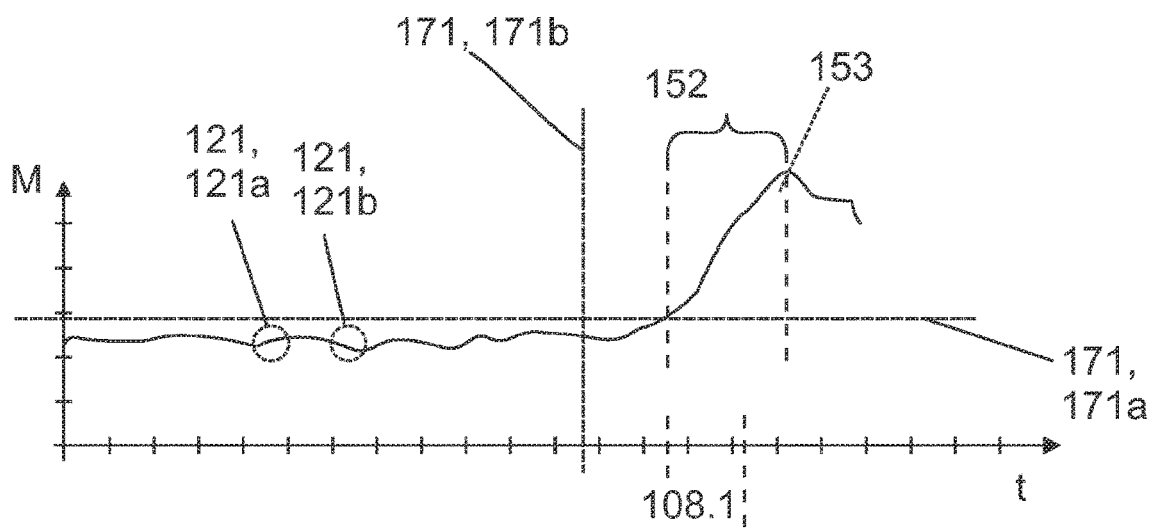
FIG. 9 is a schematic view of an acquisition value curve.

FIG. 9 shows a typical time curve 107, in particular filtered curve 107b, of the recordings 101 and/or relevant acquisition values 106, for example for the preparation of whipped cream. The filtered acquisition values 106b shown are dependent for example on a motor signal M as the acquisition variable 102. It can be seen that initially (up to the second threshold value 171b), only minor fluctuations occur, and a steady trend can thus be identified. The features 121 can be generated for example by means of a difference and/or a gradient of the acquisition values 106 being determined. A feature evaluation then makes it possible, for example, for the generated feature 121 to be used for identifying a specific pattern in the curve 107. For this purpose, the time-dependent analysis 140 for example can also be performed on the basis of the acquisition values 106 and/or generated features 121. In this case, the threshold values 171 can be used to check the plausibility of the analysis result. The threshold values 171 are in particular defined empirically, such that for example a second threshold value 171b specifies the timepoint at which the desired preparation state (e.g. the desired consistency of the whipped cream) occurs at the earliest. In this case, a curve pattern 152 can be identified in the marked range 152 that indicates the desired timepoint of the preparation. In this case, the occurrence of the curve pattern 152, i.e. for example the specific change in the gradient and/or the trend, results in particular from the influence of the food on the preparation device 50. It is thus possible, for example, for the consistency, which has changed owing to the preparation, to cause a mixing resistance to increase or decrease and thus the motor current of the electromotor 31 for the mixer 51 to increase or decrease accordingly. The acquisition values 106 are therefore dependent on the preparation (for example the mixing resistance, and the curve pattern 152 of the acquisition values 106 can thus be used in particular for evaluating the preparation and/or consistency.

The curve pattern 152 is for example empirically predefined. It may be possible for a comparison specification such as the curve pattern 152 to be detected by means of the time-dependent analysis 140 and/or the process of carrying out the decision 150. The detection of the curve pattern 152 then allows for an early prediction of a critical point 153 at which the desired preparation state occurs. In particular, the steps of the method 100 according to the invention can be adjusted and/or temporally restricted for example by means of a real-time requirement, such that the control signal 161 is emitted in due time, despite an evaluation latency period, in order to influence and/or deactivate the preparation mode when the desired state or the critical point 153 has been temporally reached.

It may furthermore be possible for the recordings 101 and/or the acquisition values 106, in particular the filtered curve 107b, to be able to be consulted for generating features. It is thus possible to generate, for example, a first generated feature 121a and a second generated feature 121b by means of an evaluation. The first generated feature 121a in this case indicates for example a rise (i.e. a positive difference), and the further generated feature 121b in this case indicates for example a drop (i.e. a negative difference). It is furthermore possible for a comparison specification, in particular a curve pattern 152, in the curve pattern 107 to be detected by means of the feature evaluation and/or the time-dependent analysis 140. For this purpose, a histogram is evaluated for example. As shown in FIG. 9, the curve pattern 152 (on the basis of the prepared food) corresponds for example to a continuous increase in the acquisition values 106 over a specified phase. Depending on the food, a first comparison specification, such as a first curve pattern 152, may exhibit a continuous rise and a second comparison specification, such as a second curve pattern 152, may exhibit a continuous drop in the acquisition values 106 said values. On the basis of a user setting, the corresponding first or second comparison specification is then taken into account.

A plausibility check of the analysis result, in particular also the definition of the value range of the recordings 101 and/or acquisition values 106 for carrying out the decision 150, is made possible by the threshold values 171. The threshold value 171 in particular comprises at least one first threshold value 171, 171a, which is shown by a dashed horizontal line in FIG. 7. A decision is carried out 150 and/or a positive decision result 151 is determined only when the acquisition values 106 currently identified are above the first threshold value 171, 171a. A second threshold value 171, 171b preferably makes it possible to limit the period of time for carrying out the decision 150, which second threshold value is shown by a vertical dashed line. Correspondingly, a decision is carried out 150 and/or a positive decision result 151 is determined only when the temporal duration of the preparation mode temporally exceeds the second threshold value 171b.

Furthermore, FIG. 9 shows a first timepoint 108.1, at which for example a first recording 101.1 is carried out and/or identified, and a second timepoint 108.2 is indicated, at which for example a second recording 101.2 is carried out and/or identified. In this case, the respective timepoints 108.1, 108.2 can of course also be a (short) phase, such as a time period, for example an exposure period, and/or a measurement time, for example a temperature measurement time.

The above explanation of the embodiments describes the present invention merely within the context of examples. Of course, individual features of the embodiments can, insofar as technically reasonable, be combined with one another as desired without departing from the scope of the present invention.

LIST OF REFERENCE CHARACTERS 10 food processor
20 housing
21 lid
22 mixing vessel holder
23 handle
24 mixing vessel
25 display
26 control panel
30 drive means
31 motor
50 preparation device
51 processing tool, mixer
52 sensor
52.1 first sensor
52.2 second sensor
53 heating element
54 scale
100 method
101 recording
101.1 first recording
101.2 second recording
102 acquisition variable
102.1 first acquisition variable
102.2 second acquisition variable
105 acquisition
105.1 first acquisition
105.2 second acquisition
106 acquisition values
106.1 first acquisition values
106.2 second acquisition values
106a unfiltered acquisition values
106b filtered acquisition values
107 curve
107.1 first curve
107.2 second curve
107a unfiltered curve
107b filtered curve
108.1 first timepoint
108.2 second timepoint
110 filtering
121 generated feature
121a first generated feature
121b second generated feature
140 analysis
150 carrying out a decision
151 decision result
152 curve pattern
153 critical point
160 control
161 control signal
161.1 first control signal
161.2 second control signal
171 threshold value
171a first threshold value
171b second threshold value
200 monitoring device
210 processing device
220 non-volatile memory
t time
M measuring variable, motor signal

The invention claimed is:

1. A food processor comprising at least one preparation device and at least one monitoring device, wherein,
   in a preparation mode, the preparation device can be controlled for at least partially automatic preparation of food, and
   the monitoring device comprises at least one sensor for identifying at least one first and second recording at at least one first and second timepoints of the preparation, wherein the second recording can be identified temporally following the first recording, and
   the first recording differs from the second recording such that a specified future preparation state can be ascertained on the basis of the difference, wherein
   the monitoring device comprises a processing device, by means of which analysis information can be determined on the basis of at least one of the first or second recording, and
   an analysis of the analysis information can be performed in order to determine an analysis result specific to a specified future preparation state, and
   at least one control signal can be emitted in order to influence the preparation mode on the basis of the analysis result.

2. The food processor according to claim 1, wherein the sensor, comprises at least one of the following sensor units:
   an optical sensor unit;
   an acoustic sensor unit;
   an electronic nose;
   at least one thermal sensor unit;
   a level sensor unit;
   a steam sensor unit for acquiring a steam resulting from the preparation;
   a moisture sensor unit;
   a pressure sensor unit;
   a scanner, for acquiring information relating to at least one of the preparation or the food; and
   at least one chemical sensor unit.

3. The food processor according to claim 1, wherein the monitoring device comprises a first sensor and a second sensor, the first sensor differing from the second sensor with respect to the variable to be acquired, such that the first sensor can identify the first and second recording, and the second sensor can identify at least one further recording, wherein the first and second recording are of the same type as one another and are of a different type from the further recording.

4. The food processor according to claim 1, wherein the sensor comprises at least one of the following electrical components:
- an RFID sensor;
- an electrical energy intake unit, for at least one of energy transfer or energy intake for an operation of the sensor; and
- an electrical energy store.

5. The food processor according to claim 1, wherein at least one of the monitoring device or the sensor comprises at least one of the following interfaces:
- a network interface; and
- a radio interface.

6. The food processor according to claim 1, wherein the sensor is fastened to the food processor so as to be detachable at least in part, and is designed as a sensor that can be handled separately by a user of the food processor in order to perform an acquisition on food at least one of inside or outside at least one of the food processor or a mixing vessel of the food processor.

7. The food processor according to claim 1, wherein the sensor is integrated in a mixing vessel of the food processor.

8. The food processor according to claim 1, wherein the sensor is designed such that it can be retrofitted.

9. The food processor according to claim 1, wherein at least one of a mixing vessel holder of the food processor, or a mixing vessel of the food processor that can be inserted into at least one of the mixing vessel holder, or a lid of the mixing vessel that can be placed on the mixing vessel, comprises at least one electrical contact for establishing an electrical connection to an electrical circuit of the food processor in at least one of an inserted or placed on state.

10. The food processor according to claim 1, wherein the sensor is designed as an at least two-dimensional or three-dimensional sensor.

11. The food processor according to claim 1, wherein the sensor is arranged inside the food processor, such that it is possible to acquire an acquisition variable directly on the food in order to identify the recording.

12. The food processor according to claim 1, wherein the sensor is arranged on the food processor so as to be in contact with the environment of the food processor such that acquisition variables of the environment of the food processor can be acquired by the sensor.

13. A method for operating a food processor, wherein at least one preparation device of the food processor is controlled, in a preparation mode, so as to at least partially automatically prepare food, and a monitoring device identifies at least one recording of the prepared food that is specific to a preparation state, the method comprising:
a) identifying at least one first recording of the prepared food at at least one first timepoint of the preparation;
b) identifying at least one second recording of the prepared food at at least one second timepoint of the preparation, the first timepoint differing from the second timepoint and the first recording differing from the second recording such that a specified future preparation state can be ascertained on the basis of the difference;
c) determining an analysis information on the basis of at least one of the first recording or the second recording;
d) performing at least one analysis of the analysis information in order to determine an analysis result specific to a specified future preparation state; and
e) emitting at least one control signal for influencing the preparation mode on the basis of the analysis result, such that the specified future state is taken into account for the preparation.

14. The method according to claim 13, wherein the specified future preparation state is an optimal future completion time of the prepared food during the preparation, wherein the first recording is identified during preparation mode and the second recording is identified after the preparation mode has been deactivated, wherein the following steps are provided:
performing a first analysis on the basis of the first recording in order to determine a first analysis result, a first control signal for deactivating the preparation mode being emitted on the basis of the first analysis result; and
performing a second analysis on the basis of the second recording in order to determine a second analysis result, a second control signal for re-activating the preparation mode being emitted on the basis of the second analysis result.

15. The method according to claim 13, wherein the recording is identified by means of at least two-dimensional acquisition of at least one acquisition variable.

16. The method according to claim 13, wherein at least one of the first recording or second recording is an image recording of at least one of the prepared food or an acoustic recording of a sound of the food processor in preparation mode that is dependent on the preparation.

17. The method according to claim 13, wherein during the analysis, the first recording is compared with at least one of the second recording or for the identified recordings are each compared with a comparison specification, in order to determine an analysis result.

18. The method according to claim 13, wherein the following steps are provided:
at least one of setting or selecting a food to be prepared, by means of user input on the food processor;
selecting a comparison specification on the basis of at least one of the set or selected food; and
comparing values of at least one of the analysis information or of the analysis result with the comparison specification in order to determine the specified future state.

19. The method according to claim 13, wherein in preparation mode, the preparation device comprising a mixer is controlled for at least partially automatic preparation of different foods, wherein at least one food-specific comparison specification, for comparison with at least one of the recording or the analysis result, is provided for each of said foods.

20. The method according to claim 13, wherein
a food processor comprising at least one preparation device and at least one monitoring device, wherein,
in a preparation mode, the preparation device can be controlled for at least partially automatic preparation of food, and
the monitoring device comprises at least one sensor for identifying at least one first and second recording, wherein the second recording can be identified temporally following the first recording, and
the first recording differs from the second recording such that a specified future preparation state can be ascertained on the basis of the difference, wherein the monitoring device comprises a processing device, by means of which analysis information can be determined on the basis of at least one of the first and/or second recording, and an analysis of the analysis information can be performed in order to determine an analysis result specific to a specified future preparation state, and at least one control signal can be emitted in order to influence the preparation mode on the basis of the analysis result, is provided.

21. A computer program product for operating a food processor, wherein the computer program product is configured to carry out a method according to claim 13.

* * * * *